(12) United States Patent
Kim et al.

(10) Patent No.: US 10,393,580 B2
(45) Date of Patent: Aug. 27, 2019

(54) SPECTROMETER INCLUDING LIGHT FILTER

(71) Applicant: SAMSUNG ELECTRONICS CO., LTD., Suwon-si (KR)

(72) Inventors: Hyochul Kim, Yongin-si (KR); Younggeun Roh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/805,590

(22) Filed: Nov. 7, 2017

(65) Prior Publication Data

US 2019/0033129 A1 Jan. 31, 2019

(30) Foreign Application Priority Data

Jul. 26, 2017 (KR) .................. 10-2017-0094961

(51) Int. Cl.
*G01J 3/02* (2006.01)
*G01J 3/12* (2006.01)
*G01J 3/18* (2006.01)
*G01J 3/28* (2006.01)
*G01J 3/36* (2006.01)

(52) U.S. Cl.
CPC ........... *G01J 3/0229* (2013.01); *G01J 3/0259* (2013.01); *G01J 3/1804* (2013.01); *G01J 3/2803* (2013.01); *G01J 3/2823* (2013.01); *G01J 3/36* (2013.01); *G01J 2003/1213* (2013.01)

(58) Field of Classification Search
CPC ....... G01J 3/0229; G01J 3/2803; G01J 3/2823
See application file for complete search history.

(56) References Cited

U.S. PATENT DOCUMENTS

| 4,244,045 | A | * | 1/1981 | Nosu | G02B 6/29367 |
| | | | | | 398/86 |
| 5,850,292 | A | * | 12/1998 | Braun | G01J 3/36 |
| | | | | | 356/419 |
| 5,995,235 | A | * | 11/1999 | Sui | G01N 21/255 |
| | | | | | 250/226 |
| 6,603,897 | B1 | * | 8/2003 | Scholz | G02B 6/29367 |
| | | | | | 359/260 |
| 6,631,222 | B1 | * | 10/2003 | Wagener | H04Q 11/0005 |
| | | | | | 385/16 |
| 6,870,976 | B2 | * | 3/2005 | Chen | G02B 6/29367 |
| | | | | | 264/1.1 |
| 7,433,552 | B2 | | 10/2008 | Kiesel et al. | |
| 7,787,924 | B2 | | 8/2010 | Acosta et al. | |
| 9,631,976 | B2 | | 4/2017 | Kim | |
| 2003/0016359 | A1 | * | 1/2003 | Jung | G01J 1/06 |
| | | | | | 356/419 |
| 2004/0070765 | A1 | * | 4/2004 | Yamauchi | G01J 3/26 |
| | | | | | 356/451 |

(Continued)

FOREIGN PATENT DOCUMENTS

KR  10-2016-0024608 A  3/2016

*Primary Examiner* — Dominic J Bologna
(74) *Attorney, Agent, or Firm* — Sughrue Mion, PLLC (57) ABSTRACT

A spectrometer is provided and includes a substrate including a transparent material, and a filter array disposed on a first surface of the substrate and including light filters configured to reflect first light. The spectrometer further includes a first light detector into which the first light reflected by the light filters enters, the first light detector being disposed on a second surface of the substrate.

15 Claims, 5 Drawing Sheets

(56) References Cited

U.S. PATENT DOCUMENTS

| | | | |
|---|---|---|---|
| 2004/0208452 A1* | 10/2004 | Kropp | G02B 6/29367 385/47 |
| 2013/0309135 A1* | 11/2013 | Park | G01N 21/17 422/69 |
| 2015/0144770 A1 | 5/2015 | Choi | |
| 2015/0219494 A1 | 8/2015 | Hruska et al. | |

* cited by examiner

SPECTROMETER INCLUDING LIGHT FILTER

CROSS-REFERENCE TO RELATED APPLICATION

This application claims priority from Korean Patent Application No. 10-2017-0094961, filed on Jul. 26, 2017, in the Korean Intellectual Property Office, the disclosure of which is incorporated herein in its entirety by reference.

BACKGROUND

1. Field

Apparatuses consistent with example embodiments relate to optical apparatuses, and more particularly, to spectrometers including light filters.

2. Description of the Related Art

A spectrometer is an apparatus for configuring sensors used in various fields, such as non-invasive medical sensors or Internet of Things sensors. Accordingly, there is a growing demand for miniaturization of spectrometers used for various applications.

To form a spectrometer, a filter structure including a prism or a grating has been usually used. Various studies have been conducted to overcome the limitations regarding miniaturization, angular sensibility to light, and light sensitivity of the spectrometer.

SUMMARY

According to an aspect of an example embodiment, there is provided a spectrometer including a substrate including a transparent material, a filter array disposed on a first surface of the substrate and including light filters configured to reflect first light, and a first light detector into which the first light reflected by the light filters enters, the first light detector being disposed on a second surface of the substrate.

The light filters may be further configured to respectively transmit first lights of different wavelength bands.

The light filters may be further configured to reflect second lights of wavelength bands different than the first lights of different wavelength bands.

The spectrometer may further include a second light detector into which second light that is passed through the filter array enters, the second light detector being disposed on the filter array.

The light filters may be arranged in a 1-dimensional pattern or a 2-dimensional mosaic pattern.

Each of the first light detector and the second light detector may include light detector units respectively corresponding to the light filters.

Each of the first light detector and the second light detector may include any one or any combination of an image sensor, a charge coupled device (CCD), and a photo diode.

Any one or any combination of the light filters may include more than two bandpass filter wavelengths.

According to an aspect of an example embodiment, there is provided a spectrometer including a substrate including a transparent material, a filter array disposed on a first surface of the substrate and including light filters configured to reflect first light, and a first light detector into which the first light reflected by the light filters enters, the first light detector being disposed on a second surface of the substrate. The spectrometer further includes a second light detector into which second light that is passed through the filter array enters, the second light detector being disposed on the filter array, and a diffraction grating disposed on the second surface of the substrate and configured to transmit incident light incident to the substrate, to the filter array.

The light filters may be further configured to respectively transmit first lights of different wavelength bands.

The light filters may be further configured to reflect second lights of wavelength bands different than the first lights of different wavelength bands.

The light filters may be arranged in a 1-dimensional pattern or a 2-dimensional mosaic pattern.

Each of the first light detector and the second light detector may include light detector units respectively corresponding to the light filters.

Each of the first light detector and the second light detector may include any one or any combination of an image sensor, a charge coupled device (CCD), and a photo diode.

Any one or any combination of the light filters may include more than two bandpass filter wavelengths.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Reference will now be made in detail to example embodiments, examples of which are illustrated in the accompanying drawings so that those of ordinary skill in the art may readily understand. The example embodiments may, however, be embodied in many different forms and should not be construed as being limited to the following description. In the drawings, portions irrelevant to the description are omitted for convenience of explanation. Like reference numerals are used to like elements throughout the specification.

In the descriptions of the example embodiments, it will be understood that, when an element is referred to as being connected to another element, it may include electrically connected when the element is directly connected to the other element and when the element is indirectly connected to the other element by intervening a constituent element. It may be understood that, when a part "comprises" or "includes" an element in the specification, unless otherwise defined, it is not excluding other elements but may further include other elements.

Figure 1:
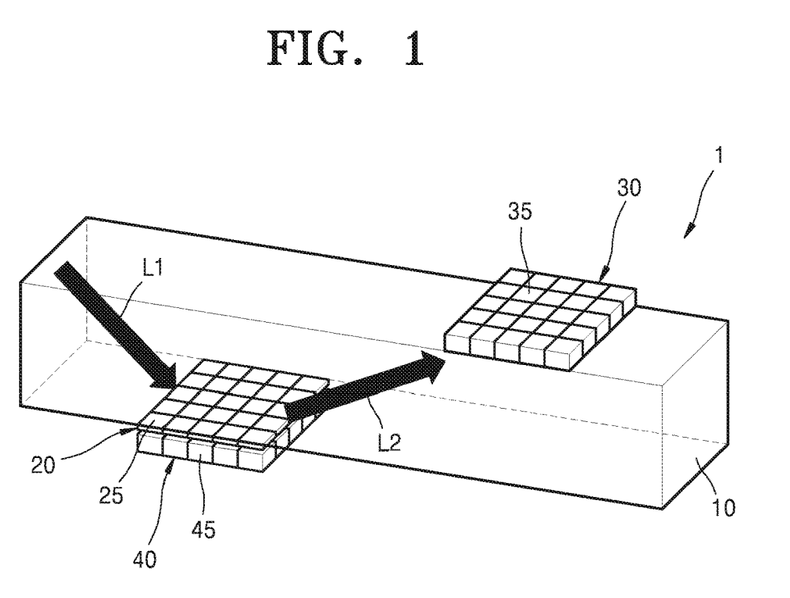
FIG. 1 is a schematic perspective view of a spectrometer according to an example embodiment.

FIG. 1 is a schematic perspective view of a spectrometer 1 according to an example embodiment.

Referring to FIG. 1, the spectrometer 1 may include a substrate 10, a filter array 20, a first light detector 30, and a second light detector 40.

The substrate 10 is a place where light enters, and the filter array 20, the first light detector 30, and the second light detector 40 may be arranged on the substrate 10.

The substrate 10 may include a material having a light transmittance characteristic. For example, the substrate 10 may include glass, sapphire, quartz, or transparent polymer, but is not limited thereto.

The filter array 20 may be arranged on a surface of the substrate 10. The filter array 20 may include a plurality of light filters 25. The light filters 25 may respectively transmit lights of wavelength bands different from each other, and each of the light filters 25 may reflect lights of wavelength bands except the light of a wavelength band that the light filter 25 transmits. That is, the light filters 25 of the filter array 20 may be band-pass filters.

Any one or any combination of the light filters 25 may have at least two band pass filter wavelengths. The light filters 25 of the filter array 20 may be arranged in a 1 dimensional (1D) grating pattern or a 2 dimensional (2D) mosaic pattern. FIG. 1 shows the 2 dimensional (2D) mosaic pattern.

The first light detector 30 may be disposed on the substrate 10 to face the filter array 20 with the substrate 10 therebetween. The first light detector 30 may sense incident light, and may include an image sensor, a charge coupled device (CCD), a photodiode, or a phototransistor. The first light detector 30 may include a plurality of light detector units 35 respectively corresponding to each of the light filters 25 included in the filter array 20. That is, the first light detector 30 may include the light detector units 35 in same number as or more than a number of the light filters 25 included in the filter array 20.

Light L2 that does not pass and is reflected by the filter array 20 may enter the first light detector 30, and the first light detector 30 may sense the incident light L2.

The second light detector 40 may be arranged on a lower side of the filter array 20. The second light detector 40 may sense incident light, and may include an image sensor, a CCD, a photodiode, or a phototransistor. The second light detector 40 may include a plurality of light detector units 45 respectively corresponding to the number of light filters 25 included in the filter array 20. That is, the second light detector 40 may include the light detector units 45 in same number as or more than the number of the light filters 25 included in the filter array 20.

From the light L1 incident to the filter array 20 through the substrate 10, light that passed through the filter array 20 may enter the second light detector 40, and the second light detector 40 may sense the light that passed through the filter array 20. Because the light detector units 45 of the second light detector 40 respectively corresponds to the light filters 25 of the filter array 20, a wavelength band of the light L1 that enters the filter array 20 may be known.

In the spectrometer 1 according to the present embodiment, light that passed through the filter array 20 is sensed by the second light detector 40, and light reflected by the filter array 20 is sensed by the first light detector 30.

Therefore, all light signals incident to the spectrometer 1 may be transmitted to the first light detector 30 or the second light detector 40 without any loss.

Figure 2:
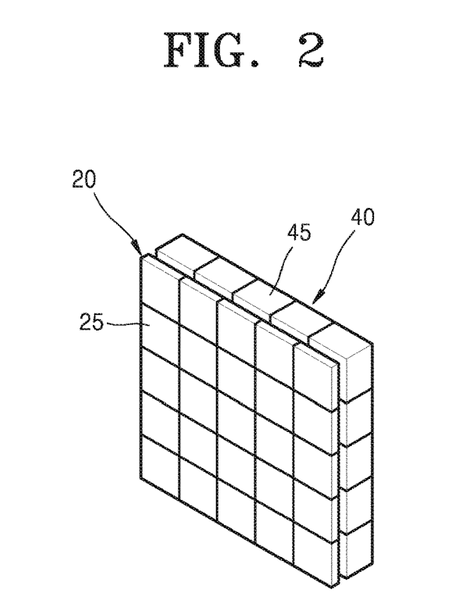
FIG. 2 is a magnified perspective view of a filter array and a second light detector of a spectrometer, according to an example embodiment.

FIG. 2 is a magnified perspective view of the filter array 20 and the second light detector 40 of the spectrometer 1, according to an example embodiment.

Referring to FIG. 2, the second light detector 40 may include a plurality of light detector units 45 respectively corresponding to the light filters 25 included in the filter array 20. Light that passed through each of the light filters 25 may enter the light detector units 45 respectively corresponding to the light filters 25. Accordingly, if light of a wavelength band transmitted through each of the light filters 25 is known in advance, a wavelength band of the light incident to the filter array 20 may be known through the sensing of the light detector units 45.

Figure 3A:
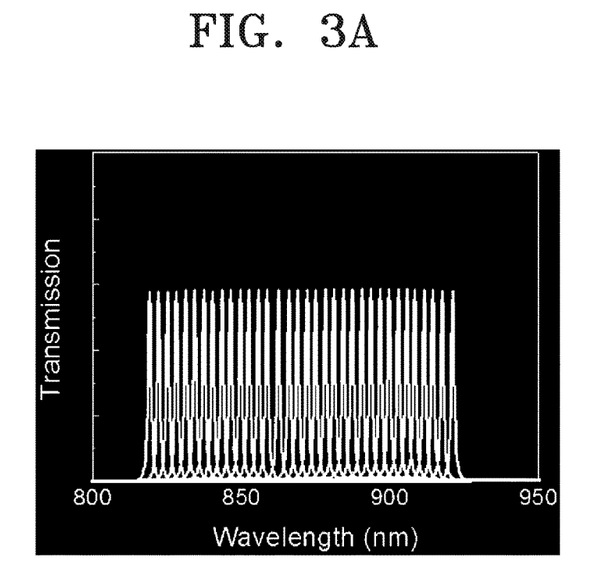
FIGS. 3A and 3B are graphs showing transmittance and reflectance according to wavelengths of a plurality of light filters of a filter array of FIGS. 1 and 2.
Figure 3B:
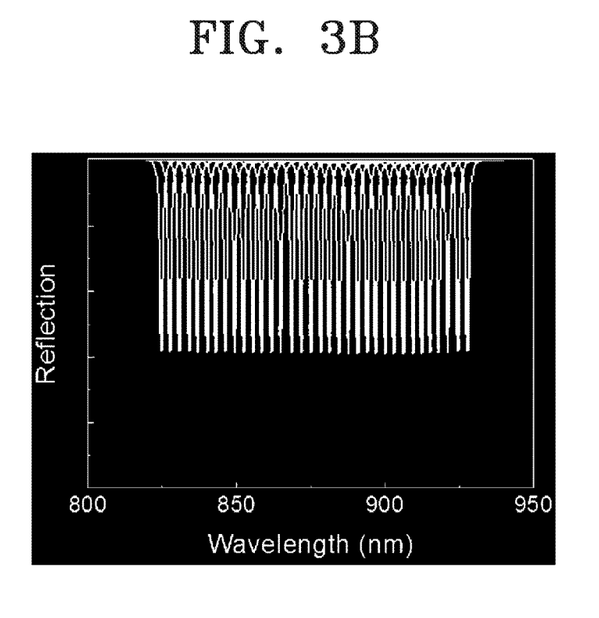

FIGS. 3A and 3B are graphs showing transmittance and reflectance according to wavelengths of the light filters 25 of the filter array 20 of FIGS. 1 and 2.

Referring to FIG. 3A, each peak indicates a wavelength band of light that may be transmitted through each of the light filters 25. That is, when a filter array 20 is configured by using the light filters 25 having pass-band characteristics as the graph in FIG. 3A, the spectrometer 1 may sense light having a wavelength in a range from about 820 nm to about 920 nm. Light that passed through the filter array 20 may be sensed by the light detector units 45 of the second light detector 40.

Referring to FIG. 3B, peaks indicate wavelength bands of light that is not reflected by the light filters 25. That is, each of the light filters 25 may reflect lights of wavelength bands except the light of a wavelength band that the light filter 25 transmits. Light reflected by the light filters 25 may enter the first light detector 30, and the light detector units 35 of the first light detector 30 may analyze an optical signal by sensing the light.

Figure 4A:
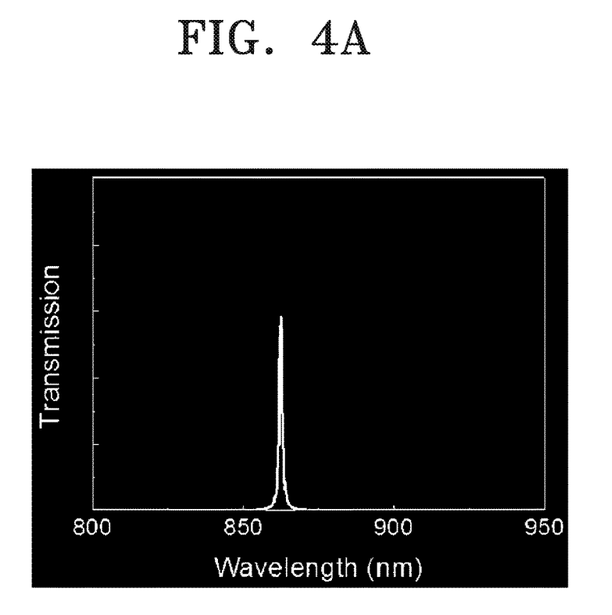
FIGS. 4A and 4B are graphs showing transmittance and reflectance according to a wavelength of a light filter of a plurality of light filters, according to an example embodiment.
Figure 4B:
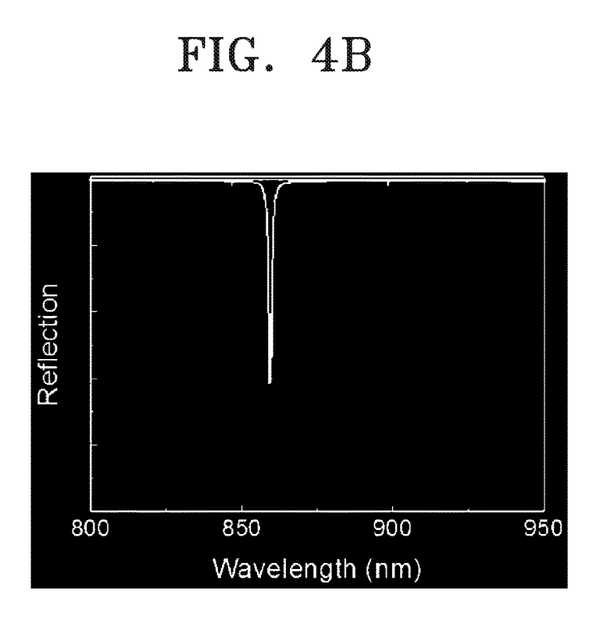

FIGS. 4A and 4B are graphs showing transmittance and reflectance according to a wavelength of one light filter 25 of the plurality of light filters 25, according to an example embodiment.

Referring to FIGS. 4A and 4B, a peak in FIG. 4A indicates a wavelength band of light that one of the light filters 25 may transmit, and a peak in FIG. 4B indicates a wavelength band of light that the one of the light filters 25 may not reflect. The wavelength band of light that the light filter 25 transmits and the wavelength band of light that the light filter 25 does not reflect may be identical. A single light filter 25 may transmit one wavelength band of light.

Figure 4C:
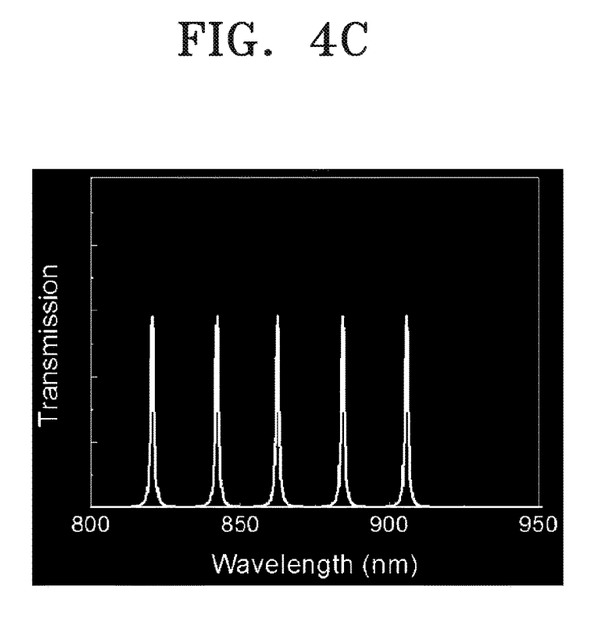
FIGS. 4C and 4D are graphs showing transmittance and reflectance according to wavelengths of a plurality of light filters, according to another example embodiment.
Figure 4D:
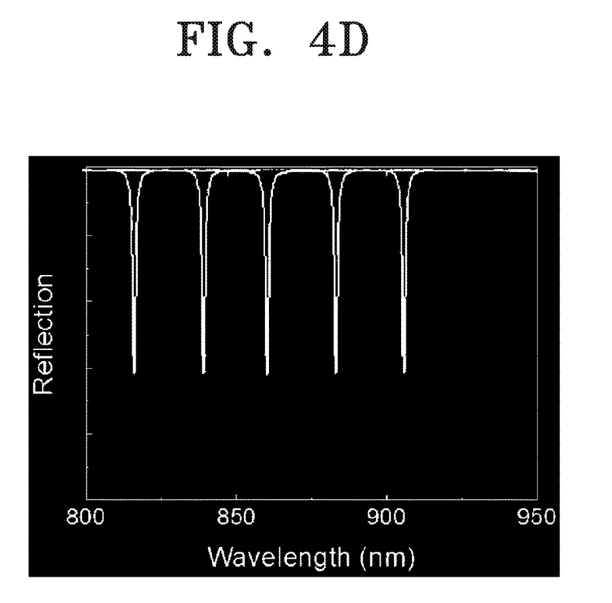

FIGS. 4C and 4D are graphs showing transmittance and reflectance according to wavelengths of one light filter 25 of the plurality of light filters 25, according to another example embodiment.

Referring to FIGS. 4C and 4D, peaks in FIG. 4C indicate a wavelength band of light that one of the light filters 25 transmits, and peaks in FIG. 4D indicate a wavelength band of light that the one of the light filter 25 does not reflect. In FIGS. 4C and 4D, a single light filter 25 may transmit more than two wavelength bands of light. That is, in the spectrometer 1 of FIG. 1, any one or any combination of the light filters 25 may have more than two band pass filter wavelengths.

Figure 5:
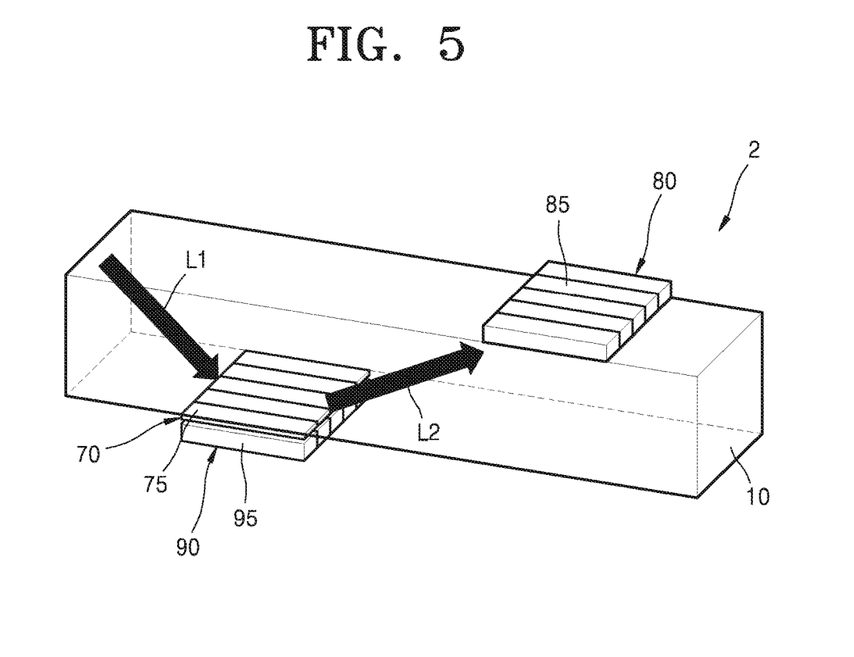
FIG. 5 is a schematic perspective view of a spectrometer according to another example embodiment.

FIG. 5 is a schematic perspective view of a spectrometer 2 according to another example embodiment. Like reference numerals are used to indicate elements that are substantially the same elements of FIGS. 1 and 5, and the description thereof are omitted.

Referring to FIG. 5, the spectrometer 2 may include a substrate 10, a filter array 70, a first light detector 80, and a second light detector 90.

The substrate 10 is a place where light enters, and the filter array 70, the first light detector 80, and the second light detector 90 may be arranged on the substrate 10.

The filter array 70 may be arranged on a surface of the substrate 10. The filter array 70 may include a plurality of light filters 75. The light filters 75 may respectively transmit lights of wavelength bands different from each other, and each of the light filters 75 may reflect lights of wavelength bands except the light of a wavelength band that the light filter 75 transmits. That is, the light filters 75 of the filter array 70 may be band-pass filters.

Any one or any combination of the light filters 75 may have at least two band pass filter wavelengths. The light filters 75 of the filter array 70 may be arranged in a 1 dimensional (1D) grating pattern or a 2 dimensional (2D) mosaic pattern. FIG. 5 shows the 1 dimensional (1D) grating pattern.

The first light detector 80 may be disposed on the substrate 10 to face the filter array 70 with the substrate 10 therebetween. The first light detector 80 may sense incident light, and may include an image sensor, a charge coupled device (CCD), a photodiode, or a phototransistor. The first light detector 80 may include a plurality of light detector units 85 respectively corresponding to each of the light filters 75 included in the filter array 70. That is, the first light detector 80 may include the light detector units 85 in same number as or more than a number of the light filters 75 included in the filter array 70.

Light L2 that does not pass and is reflected by the filter array 70 may enter the first light detector 80, and the first light detector 80 may sense the incident light L2.

The second light detector 90 may be arranged on a lower side of the filter array 70. The second light detector 90 may sense incident light, and may include an image sensor, a CCD, a photodiode, or a phototransistor. The second light detector 90 may include a plurality of light detector units 95 respectively corresponding to the number of light filters 75 included in the filter array 70. That is, the second light detector 90 may include the light detector units 95 in same number as or more than the number of the light filters 75 included in the filter array 70.

The operation of the spectrometer 2 may be well-known from the operation of the spectrometer 1, thus the operation of the spectrometer 2 is not repeated.

Figure 6:
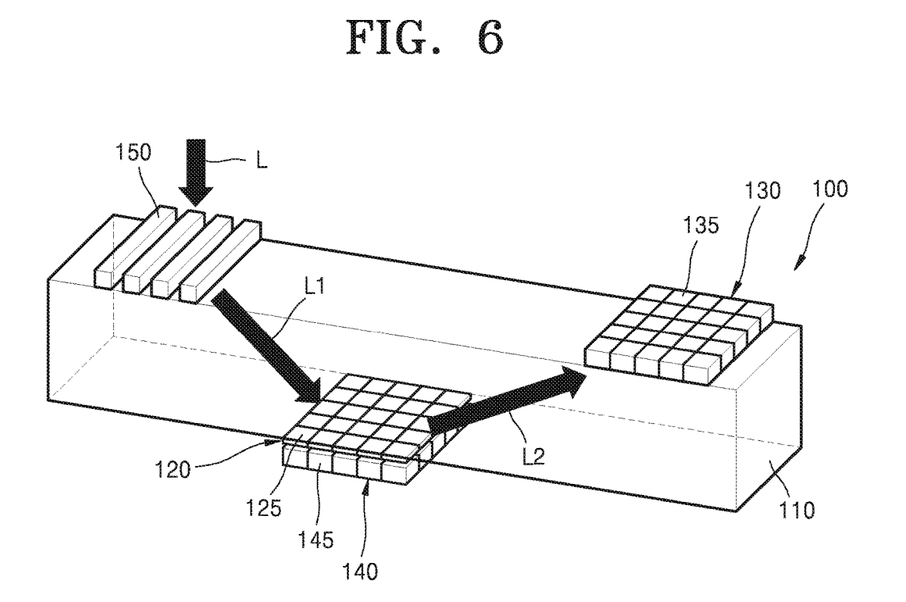
FIG. 6 is a schematic perspective view of a spectrometer according to another example embodiment.

FIG. 6 is a schematic perspective view of a spectrometer 100 according to another example embodiment.

Referring to FIG. 6, the spectrometer 100 includes a substrate 110, a filter array 120, a first light detector 130, a second light detector 140, and a diffraction grating 150.

The substrate 110 may include a material having transmittance characteristic. For example, the substrate 110 may include glass, sapphire, quartz, or transparent polymer, but is not limited thereto.

The filter array 120 may be arranged on a surface of the substrate 110, and the filter array 120 may include a plurality of light filters 125. The light filters 125 may respectively transmit lights of wavelength bands different from each other, and each of the light filters 25 may reflect light of a wavelength band except the lights of wavelength bands that the light filters 25 transmit. That is, the light filters 125 of the filter array 120 may be band-pass filters.

Any one or any combination of the light filters 125 may have more than two band pass filter wavelengths. The light filters 125 of the filter array 120 may be arranged in a 1D grating pattern or a 2D mosaic pattern. FIG. 6 shows the 2 dimensional (2D) mosaic pattern. However, the present embodiment is not limited thereto. For example, the light filters 125 of the filter array 120 may be arranged in the 1D grating pattern as shown in FIG. 5.

The second light detector 140 may be arranged on a lower side of the filter array 120. The second light detector 140 may sense incident light, and may include an image sensor, a CCD, a photodiode, or a phototransistor. The second light detector 140 may include a plurality of light detector units 145 respectively corresponding to a number of light filters 125 included in the filter array 120. That is, the second light detector 140 may include the light detector units 145 in the same number as or more than the number of the light filters 125 included in the filter array 120.

The first light detector 130 may be disposed on the substrate 110 to face the filter array 120 with the substrate 110 therebetween. The first light detector 130 may sense incident light, and may include an image sensor, a CCD, a photodiode, or a phototransistor. The first light detector 130 may include a plurality of light detector units 135 respectively corresponding to the number of light filters 125 included in the filter array 120. That is, the first light detector 130 may include the light detector units 135 in the same number as or more than the number of the light filters 125 included in the filter array 120.

The diffraction grating 150 may be arranged on a surface of the substrate 110 opposite to a surface on which the filter array 120 is arranged. The diffraction grating 150 may transmit light L1 to the filter array 120 by diffracting light L incident to the diffraction grating 150. A period or a width of diffraction grating units that constitute the diffraction grating 150 may be controlled to transmit the incident light L to the filter array 120.

Light L incident to the diffraction grating 150 arranged on the substrate 110 may enter the filter array 120 by being diffracted by the diffraction grating 150. From light L1 incident to the filter array 120, light that passed through the filter array 120 may enter the second light detector 140, and the second light detector 140 may sense the light that passed through the filter array 120. Because each of the light detector units 145 of the second light detector 140 corresponds to the light filters 125 of the filter array 120, a wavelength band of the light L1 incident to the filter array 120 may be known.

Light L2 that does not pass through the filter array 120 and is reflected by the filter array 120 may enter the first light detector 130. The light detector units 135 of the first light detector 130 may sense the reflected light L2.

According to the example embodiment described above, in the spectrometer 100, light that passed through the filter array 120 is sensed by the second light detector 140, and light reflected by the filter array 120 is sensed by the first light detector 130. Thus, all light signals incident to the spectrometer 100 may be transmitted to the first light detector 130 and the second light detector 140 without any loss.

Also, the diffraction grating 150 is arranged on a surface of the substrate 110, and thus, the size of the spectrometer 100 may be reduced.

A spectrometer according to the example embodiment described above may sense both light that passed through a filter array and light reflected by the filter array. Accordingly, all light signals entering the spectrometer may be transmitted to light detectors without any loss.

Also, a spectrometer according to an example embodiment may have a high performance with a small structure, and thus, it may be readily applied to various optical apparatuses.

The example embodiments present just examples, and thus, it will be understood by one of ordinary skill in the art that various changes in the form and details may be made therein without departing from the spirit and scope of the inventive concept. Therefore, the example embodiments may be considered in descriptive sense only and not for purposes of limitation. For example, each constituent element that is described as a singular form may be embodied in distribution forms. Also, constituent elements that are described in distribution forms may be embodied in a combined form.

Therefore, the scopes of the example embodiments are defined not by the detailed description but by the appended claims, and all differences within the scope will be construed as being included in the example embodiments.

What is claimed is:

1. A spectrometer comprising:
   a substrate comprising a transparent material;
   a filter array disposed directly on a first surface of the substrate and comprising light filters configured to reflect first light; and
   a first light detector into which the first light reflected by the light filters enters, the first light detector being disposed directly on a second surface of the substrate facing the first surface of the substrate.

2. The spectrometer of claim 1, wherein the light filters are further configured to respectively transmit first lights of different wavelength bands.

3. The spectrometer of claim 2, wherein the light filters are further configured to reflect second lights of wavelength bands different than the first lights of different wavelength bands.

4. The spectrometer of claim 2, further comprising a second light detector into which second light that is passed through the filter array enters, the second light detector being disposed on the filter array.

5. The spectrometer of claim 4, wherein the light filters are arranged in a 1-dimensional pattern or a 2-dimensional mosaic pattern.

6. The spectrometer of claim 4, wherein each of the first light detector and the second light detector comprises light detector units respectively corresponding to the light filters.

7. The spectrometer of claim 4, wherein each of the first light detector and the second light detector comprises any one or any combination of an image sensor, a charge coupled device (CCD), and a photo diode.

8. The spectrometer of claim 4, wherein any one or any combination of the light filters comprises more than two bandpass filter wavelengths.

9. A spectrometer comprising:
   a substrate comprising a transparent material;
   a filter array disposed directly on a first surface of the substrate and comprising light filters configured to reflect first light;
   a first light detector into which the first light reflected by the light filters enters, the first light detector being disposed directly on a second surface of the substrate facing the first surface of the substrate;
   a second light detector into which second light that is passed through the filter array enters, the second light detector being disposed on the filter array; and
   a diffraction grating disposed on the second surface of the substrate and configured to transmit incident light incident to the substrate, to the filter array.

10. The spectrometer of claim 9, wherein the light filters are further configured to respectively transmit first lights of different wavelength bands.

11. The spectrometer of claim 10, wherein the light filters are further configured to reflect second lights of wavelength bands different than the first lights of different wavelength bands.

12. The spectrometer of claim 9, wherein the light filters are arranged in a 1-dimensional pattern or a 2-dimensional mosaic pattern.

13. The spectrometer of claim 9, wherein each of the first light detector and the second light detector comprises light detector units respectively corresponding to the light filters.

14. The spectrometer of claim 9, wherein each of the first light detector and the second light detector comprises any one or any combination of an image sensor, a charge coupled device (CCD), and a photo diode.

15. The spectrometer of claim 9, wherein any one or any combination of the light filters comprises more than two bandpass filter wavelengths.

* * * * *